(12) United States Patent
Ruffieux et al.

(10) Patent No.: US 11,731,148 B2
(45) Date of Patent: Aug. 22, 2023

(54) APPARATUS AND SPRAY APPLICATOR

(71) Applicant: ELC-Ceratec GmbH, Hünenberg (CH)

(72) Inventors: Kurt Ruffieux, Thalwil (CH); Fredrik Brandsberg, Zurich (CH); Mark Anderson, Thalwil (CH)

(73) Assignee: ELC-CERATEC GmbH, Hünenberg (CH)

( * ) Notice: Subject to any disclaimer, the term of this patent is extended or adjusted under 35 U.S.C. 154(b) by 49 days.

(21) Appl. No.: 17/617,820

(22) PCT Filed: Jun. 2, 2020

(86) PCT No.: PCT/EP2020/065186
§ 371 (c)(1),
(2) Date: Dec. 9, 2021

(87) PCT Pub. No.: WO2020/249423
PCT Pub. Date: Dec. 17, 2020

(65) Prior Publication Data
US 2022/0258190 A1    Aug. 18, 2022

(30) Foreign Application Priority Data

Jun. 11, 2019   (CH) .................................... 00786/19

(51) Int. Cl.
*B05B 11/00*    (2023.01)
*B05B 11/10*    (2023.01)
(52) U.S. Cl.
CPC ...... *B05B 11/0067* (2013.01); *B05B 11/1091* (2023.01); *B05B 11/1095* (2023.01)
(58) Field of Classification Search
CPC ............. B05B 11/0067; B05B 11/1091; B05B 11/1095
(Continued)

(56) References Cited

U.S. PATENT DOCUMENTS 3,827,601 A * 8/1974 Magrath ............... A61M 5/162
                                                              222/324
3,952,919 A * 4/1976 Hansen ................. A61M 5/204
                                                              222/89
(Continued)

FOREIGN PATENT DOCUMENTS

EP    1 616 630 A2   1/2006
GB    1 551 038       8/1979
(Continued)

OTHER PUBLICATIONS

International Search Report Corresponding to PCT/EP2020/065186 dated Sep. 21, 2020.
(Continued)

*Primary Examiner* — Paul R Durand
*Assistant Examiner* — Michael J. Melaragno
(74) *Attorney, Agent, or Firm* — Finch & Maloney PLLC (57) ABSTRACT

An apparatus (100) for metered dispensing of a liquid from a container (3) and a spray applicator having the apparatus (100). The apparatus (100) comprises a base body (5) and a nozzle body (16) having an outlet nozzle. The nozzle body (16) is mounted so as to be displaceable relative to the base body (5) from a dispensing to a clamping position. The apparatus (100) comprises a reset spring (14) for moving the nozzle body (16) from the clamping to the dispensing position. The nozzle body (16) and the valve body form a burst chamber (19). By pressure on the trigger mechanism (26), the locking of the valve body (10) is triggered and the spray burst spring (7) presses the valve body (10) in the nozzle direction. A non-return valve is arranged upstream in the valve body. The spray burst chamber is connected to the outlet nozzle.

19 Claims, 5 Drawing Sheets

(58) Field of Classification Search
USPC .......................................................... 222/162
See application file for complete search history.

(56) References Cited

U.S. PATENT DOCUMENTS

| | | | | |
|---|---|---|---|---|
| 5,934,510 A * | 8/1999 | Anderson | ......... | B05B 11/00442 604/218 |
| 6,253,961 B1 * | 7/2001 | Anderson | ........... | B05B 11/1045 222/321.7 |
| 6,413,246 B1 * | 7/2002 | Harrold | ................ | B05B 11/025 604/298 |
| 6,419,663 B2 * | 7/2002 | Harrold | ............... | B05B 11/1091 604/298 |
| 7,726,520 B2 * | 6/2010 | Harrold | ............... | B05B 11/1015 222/386 |
| 7,784,646 B2 * | 8/2010 | Harrold | ................ | A61M 11/007 222/386 |
| 7,857,169 B2 * | 12/2010 | Harrold | ................ | G01F 11/027 222/386 |
| 8,047,406 B2 * | 11/2011 | Harrold | ............... | A61M 11/007 222/386 |
| 9,248,462 B2 * | 2/2016 | Csaszar | ............... | B05B 11/0008 |
| 9,833,798 B2 * | 12/2017 | Rymer | ..................... | A61D 7/00 |
| 2001/0044603 A1 * | 11/2001 | Harrold | ............... | B05B 11/1091 604/152 |
| 2006/0011659 A1 * | 1/2006 | Greiner-Perth | ..... | B05B 11/1015 222/321.7 |
| 2007/0145077 A1 * | 6/2007 | Harrold | ................. | G01F 11/027 222/321.6 |
| 2009/0283546 A1 * | 11/2009 | Harrold | ............... | B05B 11/1015 222/256 |
| 2009/0283547 A1 * | 11/2009 | Harrold | ............... | B05B 11/1092 222/256 |
| 2009/0287169 A1 * | 11/2009 | Harrold | ................. | G01F 11/025 604/311 |
| 2014/0224841 A1 * | 8/2014 | Auerbach | ........... | B05B 11/1004 222/380 |
| 2015/0251842 A1 * | 9/2015 | Rymer | ..................... | A61D 7/00 222/401 |
| 2016/0279663 A1 * | 9/2016 | Mersmann | ........... | B05B 11/0067 |
| 2020/0009014 A1 * | 1/2020 | Yang | ..................... | A61J 1/1443 |
| 2022/0258190 A1 * | 8/2022 | Ruffieux | ............... | G01F 11/025 |

FOREIGN PATENT DOCUMENTS

| | | |
|---|---|---|
| GB | 2 251 898 A | 7/1992 |
| WO | 03/074189 A1 | 9/2003 |

OTHER PUBLICATIONS

Written Opinion Corresponding to PCT/EP2020/065186 dated Sep. 21, 2020.

* cited by examiner

APPARATUS AND SPRAY APPLICATOR

This application is a National Stage completion of PCT/EP2020/065186 filed Jun. 2, 2020, which claims priority from Swiss patent application serial no. 00786/19 filed Jun. 11, 2019.

FIELD OF THE INVENTION

The present invention relates to a device for the metered dispensing of a liquid and to a spray applicator for dispensing an active substance, according to the preamble of the independent claims.

BACKGROUND OF THE INVENTION

Different devices for dispensing a liquid have become known from the state of the art.

Thus for example nose sprays which activate a pump burst by way of axially pressing together the nose spray and deliver the pumped quantity of fluid in the form of a spray mist through a delivery opening have become known. Herein, a delivery opening is accordingly displaced axially. Hence the delivery opening is displaced in the direction of the nostril on use of the nose spray, so that a part of the spray mist is not distributed in the nasal cavity as is desired. Due to the movement, there exists the danger of injury or of an inadequate dispensing of an active substance which is contained in the spray mist.

Typically, newer types of nose sprays at the delivery opening comprise a valve or a closure which only opens given a defined pressure, so that the spray burst as well as the spray mist which is produced herewith is formed in a uniform manner. The necessary force on pressing together, for reaching of the minimal spray burst, can be too high for older or handicapped people to the extent that such people cannot use such products or only to a restricted extent.

A dispenser for media which comprises an applicator which is fixed with respect to a container and is with delivery opening is known from EP 1 616 630 A2. A metering chamber is filled with liquid by way of an axial moving of a piston subassembly counter to a spring force. From a certain position, the piston subassembly is automatically decoupled and a dispensing procedure takes place through the delivery opening. The device of EP 1 616 630 A2 comprises a multitude of individual elements which need to be sealed to one another. The sealing elements which are necessary in the device of EP 1 616 630 A2 are accordingly varied. Before actuating the device, the device must be already correctly placed, so that a pump burst can be delivered into a corresponding body opening, for example a nasal cavity. Furthermore, it is not evident to the user as to the exact point in time at which the pump burst is delivered.

A device for dispensing a spray burst which likewise comprises a delivery opening which is fixed with regard to a main body is known from GB 2 251 898 A. By way of rotating a cap, a piston is moved counter to the spring force of a spring, so that a chamber forms, said chamber being filled with a liquid. At the end of the movement, the piston is held in this position by way of a tab. By way of actuating a button, the tab is released and the spring moves the piston, so that the fluid is dispensed.

With regard to the device of GB 2 251 898 A as well as the device EP 1 616 630 A2, the filling procedure is dependent on the user which is to say on how quickly he actuates the device. Accordingly, on filling the respective chambers, force is applied to a greater or lesser extent, which can lead to increased demands on the seals and to faulty functioning.

SUMMARY OF THE INVENTION

It is the object of the invention to remedy one or more disadvantages of the state of the art. In particular, a device for the metered dispensing of a liquid from a container, and/or a spray applicator are to be provided, wherein these are to be simple to manufacture and in particular simple in application. Preferably, a uniform spray burst is to be provided even in the case of several repetitions.

This object is achieved by the devices which are defined in the independent patent claims. Further embodiments result from the dependent patent claims.

A device according to the invention for the metered dispensing of a liquid from a container, in particular for the dispensing of a spray mist, comprises a main body for fastening to the container, and a nozzle body with an outlet nozzle. The nozzle body is displaceably mounted with respect to the main body from a dispensing position into a loaded position. The device further comprises a restoring spring for moving the nozzle body from the loaded position into the dispensing position. The device comprises a valve body which is displaceably mounted with respect to the main body from a charging position into a discharging position. A non-return valve is arranged in the valve body. The valve body with the nozzle body forms a spray burst chamber which is variable in size. The spray burst chamber is connected to the outlet nozzle.

This configuration permits a common displacing of the nozzle body with the valve body relative to the main body. The spray burst chamber which the valve body forms together with the nozzle body is accordingly likewise movable relative to the main body and is designed independently with respect to the main body. A sealing of the spray burst chamber with respect to the main body is not necessary.

The arrangement of the non-return valve in the valve body likewise permits a manufacture and/or design of the non-return valve which is independent of the main body.

Here and hereinafter, the term non-return valve is to be understood as all valves and/or devices which permit the flow of fluid in one direction and block it in an opposite direction. By way of example, non-return valves with balls or flaps are mentioned.

The restoring spring is preferably arranged in a manner such that the nozzle body is displaceable counter to a spring pressure or spring force of the restoring spring, from the dispensing position into the loaded position. In other words, in a home position the nozzle body is held in the dispensing position by the restoring spring.

The nozzle body can be constructed in a single-part or multi-part manner and in particular comprise elements for guiding a fluid.

For forming the spray burst chamber, one can envisage hollow-cylindrical elements with a circular cross section which engage into one another and in particular are displaceably mounted in one another being formed on the valve body as well as on the nozzle body. Herein, one can envisage these hollow-cylindrical elements together forming a gap seal. It is likewise conceivable for a seal of a flexible sealing material, for example a lip seal, which seals the size-variable spray burst chamber with respect to its environment, to be arranged at least on one of the two hollow cylindrical elements. A lip seal is accordingly designed in a manner such that the valve body is displaceable with respect to the nozzle body.

If the nozzle body is situated in the dispensing position and the valve body in the discharging position, then the spray burst chamber has a small volume. Herein, the nozzle body as well as the valve body can be designed in a manner such that the volume of the spray burst chamber becomes as small as possible, so that in this position only a small quantity of a fluid can be located in the spray burst chamber.

If the nozzle body is situated in the loaded position and the valve body in the charging position, then the volume of the spray burst chamber corresponds essentially to the volume of the spray burst chamber when the nozzle body is situated in the dispensing position and the valve body in the discharging position. If the valve body now remains in the charging position and the nozzle body on account of the spring force of the restoring spring moves from the loaded position into the dispensing position, then the volume of the spray burst chamber enlarges. On account of the increase of the volume of the spray burst chamber, it is rendered possible for a fluid to be transported into the spray burst chamber.

Preferably, the volume of the spray burst chamber, formed by the difference of the volume of the spray burst chamber when the nozzle body is situated in the loaded position and the valve body is situated in the loaded position and of the volume of the spray burst chamber when the nozzle body is situated in the dispensing position and the valve body is situated in the charging position, corresponds precisely to a dose of a medicine which must be dispensed. However, this volume however can also correspond for example to half a dose, a third of a dose, a quarter of a dose or another fraction of a dose, so that two, three, four or correspondingly more charging and dispensing procedures are necessary.

The device of course comprises a flow direction, wherein the outlet nozzle is typically arranged furthest downstream and the container essentially furthest upstream with respect to the flow direction.

The non-return valve is preferably arranged upstream of the spray burst chamber and prevents a flow of the fluid from the spray burst chamber back into the container.

The non-return valve is preferably designed as a ball non-return valve and accordingly comprises a ball and a spring which holds the ball at a designated location. Herein, one can envisage the ball being formed of a metallic material. However, in particular the ball can be formed from a ceramic material, in order to prevent a contact between metallic material and the fluid, in particular in order to prevent reactions between the metallic material and the fluid. Accordingly, the spring which holds the ball can likewise be formed from a non-metallic material, for example a plastic. It would likewise be conceivable to provide a ball and/or a spring of a metallic material and to provide each of these with a corresponding coating, so that a contact between metallic material and the fluid which flows through is prevented.

Preferably, the device comprises a spray burst spring for moving the valve body from the charging position into the discharging position.

This permits the moving of the valve body from the charging position into the discharging position such that the size of the spray burst chamber is varied and a content of the spray burst chamber is subjected to pressure by way of the size-reduction of the spray burst chamber and is transported in the direction of the outlet nozzle and is accordingly dispensed through this.

The spray burst spring is preferably arranged in a manner such that the valve body is displaceable counter to a spring pressure or a spring force of the spray burst spring, from the discharging position into the charging position. In other words, in a home position the valve body is held in the discharging position by the spray burst spring.

The device can comprise an actuation element, preferably a pressure ring, wherein the actuation element is arranged on the nozzle body.

This permits the simple moving of the nozzle body.

The actuation element can be designed separately or as an integral constituent of the nozzle body.

Preferably, the nozzle body is brought into operative connection or can be brought into operative connection with the valve body in a manner such that a displacing of the nozzle body from the dispensing position into the loaded position causes a displacing of the valve body from the discharging position into the charging position.

By way of the moving of the nozzle body, the valve body can likewise be moved. In other words, the displacing of the nozzle body effects a displacing of the valve body and accordingly a loading of the spray burst spring.

Given the common displacing of the nozzle body and of the valve body, the volume of the spray burst chamber remains essentially constant.

The device can comprise an activation mechanism for holding the valve body in the charging position.

This permits the provision of the device in a defined configuration. In particular, it is rendered possible for the valve body to remain in the charging position after a release of the actuation element and the corresponding movement of the nozzle body back into the dispensing position.

By way of the valve body remaining in the charging position and the moving of the nozzle body back into the dispensing position, the volume of the spray burst chamber is enlarged, which permits a fluid to be delivered into the spray burst chamber.

In particular, the valve body is held in the charging position counter to a spring force of the spray burst spring. This permits the valve body to be held in the charging position amid biasing. In this state, no pressure acts upon the fluid in the spray burst chamber.

On account of the actuating of the activation element and the corresponding release of the valve body, this is moved in the flow direction by way of the spring force of the spray burst spring. By way of this, the volume of the spray burst chamber is reduced and the fluid which is located in the spray burst chamber is delivered downstream. A spray mist can be produced given a suitable design of the device downstream of the spray burst chamber.

The transport of the fluid out of the spray burst chamber can alternatively be effected by way of a renewed displacing of the nozzle body. In the charging position of the valve body, a displacing of the nozzle body from the dispensing position into the loaded position effects a reduction of the volume of the spray burst chamber. In particular, the displacing of the nozzle body is effected by the actuation of the actuation element. Accordingly, the spray burst chamber can be reduced in size by way of the actuating of the nozzle body and the displacing from the dispensing position into the loaded position, so that the fluid which is located in the spray burst chamber can likewise be transported downstream.

The dispensing of the fluid can hence be effected without the actuating of the activation mechanism.

The transport of the fluid downstream is rendered possible by way of the arrangement of the non-return valve in the valve body.

Alternatively, one can imagine that the device comprises a blocking element which is arranged in a manner such that a displacing of the nozzle body from the dispensing position into the loaded position is prevented when the valve body is located in the charging position, This prevents a possibly undesired manipulation of the device in the charged state.

The activation mechanism can comprise a holding element and in particular be arranged laterally of the valve body. Preferably, the activation mechanism can be actuated transversely to a flow direction of the liquid through the valve body.

This permits a simple arranging of the activation mechanism and in particular of the holding element as well as a simple actuating of the activation mechanism. Furthermore, such an arrangement corresponds to the ergonomy of the hand which holds the device and by way of this simplifies the operation.

The holding element is preferably movable radially to the flow direction, which in particular is rendered possible by the lateral arrangement of the activation mechanism.

One can envisage arranging the blocking element on the holding element.

This permits a simple prevention of the transporting of the fluid without actuating the activation mechanism. Given a radial movability of the holding element, the blocking element can be simply brought between the nozzle body and the main body or a corresponding counter bearing and a displacing of the nozzle body can be prevented.

Preferably, the holding element embraces the valve body at least regionally, in particular on the sides and preferably completely.

The embracing has the advantage that the activation mechanism can be arranged with the holding element in a manner such that the activation mechanism can be actuated by way of pressure. Furthermore, the design which is made in such a manner permits a holding of the valve body without the liquid flow being crossed and a corresponding sealing having to be carried out on the holding element and/or on the valve body.

The regional embracing permits a secure and exactly fitting holding and/or blocking of the valve body by the holding element. An embracing of the valve body on two sides permits a distribution of forces between the holding element and the valve body.

Preferably, the holding element comprises an opening with at least one arresting element, in particular for embracing the valve body.

In particular, for assembling the device, the valve body can be introduced through the opening of the holding element, wherein the arresting element permits an active connection with the valve element.

Preferably, elements for interacting with the arresting element, in particular notches, deepenings or cuts can be arranged on the valve body for the engagement of the arresting elements.

The holding element can comprise an opening. The opening comprises two different cross sections. In particular, the opening is designed as two circular openings of a different diameter which engage into one another.

Circular openings permit a simple embracing of the valve body. On account of the design of the opening as two circular openings of a different diameter, the assembly and/or the putting-together of the device can be simplified. The larger cross section permits the valve body to be introduced into the opening in an essentially contact-free manner and the smaller cross section permits the holding element to be brought into active connection with the valve body, so that the valve element can be held in the charging position.

Given such an embodiment, the arresting element and the region of the opening coincide with the smaller cross section.

One can envisage the elements on the valve body for interacting with the arresting elements being designed as a circumferential groove. This groove can have a diameter which corresponds essentially to the diameter of the smaller circle opening which provides the arresting element.

A restoring device, in particular a spring can be arranged on the activation mechanism for holding the holding element in an end position.

A restoring device permits the activation mechanism to be held in a defined position.

The restoring mechanism is preferably arranged transversely to the flow direction of the fluid and in particular essentially parallel to the movement direction of the activation mechanism.

This permits a latching of the arresting element into a corresponding element on the valve body as soon as these elements are situated in a corresponding position to one another. In other words, as soon as the valve body is moved sufficiently far counter to the flow direction, until the arresting elements and the elements for the interacting with the arresting elements of the valve body are located in one plane, these can be brought into active connection with one another, in particular automatically, by way of the restoring mechanism. Accordingly, the valve body is held in its charging position.

The outlet nozzle is preferably closed with an outlet closure element.

An entry of dirt or bacteria into the interior or the inner region of the device can be reliably prevented.

Furthermore, the closure permits a sealing of the spray burst chamber with respect to the environment. The transporting of the fluid into the spray burst chamber can therefore be created by way of a vacuum which forms in the spray burst chamber. In other words, if the valve body is held in the charging position and the nozzle body is moved from the loaded position into the dispensing position and the connection of the spray burst chamber to the outlet nozzle is closed by the sealing element, then a vacuum, by way of which a fluid can be sucked into the spray burst chamber forms in the spray burst chamber.

The outlet closure element can comprise a resiliently mounted sealing element, in particular a sealing plug.

A resiliently mounted sealing element, given a certain liquid pressure in the inside of the device, permits this element to release a corresponding opening, which is closed by the sealing element.

By way of the sealing element, it is likewise ensured that a corresponding vacuum for filling the spray burst chamber can be built up within the device.

On account of the resilient mounting, it is further ensured that the outlet nozzle is not released until a certain pressure within the device.

One can envisage the outlet closure element being compressible at least regionally, in particular being manufactured of a reversibly compressible material.

On account of the compressible material, the resilient mounting of the sealing plug can be provided as an integral constituent of the outlet closure element. This permits the simple manufacture of the outlet closure element preferably as one component.

Herein, one can envisage manufacturing the outlet closure element from a flexible substance such as rubber or a compressible foam, in particular closed-pored foam. A single-piece manufacture of the outlet closure element which has different characteristics over its length in the flow direction is likewise conceivable. Hence the outlet closure element can be manufactured in a manner such that for example in the region of the sealing plug it comprises a foam material with a lower pore size which is hardly compressible or only to a low extent, and in a region which is remote from this a foam material which is foamed with large pores and is compressible to a greater extent.

Preferably, the valve body of the device is connected or connectable to the interior of the container upstream of the non-return valve.

The contents of the container, preferably a fluid with a medicine which is dissolved therein, can be transported via the connection into the valve body and accordingly into the spray burst chamber which is located between the valve body and the nozzle body.

Herein, one can envisage a flexible tube being provided for connecting to the interior of the container.

A flexible tube permits the connecting of the valve body and/or the device to a point in the inside of the container which in designated use is lies essentially at the deepest. This permits the essentially complete emptying of the container.

Preferably, the valve body forms a re-drawing chamber which can be varied in size, upstream of the non-return valve.

A re-drawing chamber which is variable in size permits the prior preparation of a dose or a corresponding volume of fluid.

Herein, one can envisage the re-drawing chamber comprising a correspondingly large volume when the valve body is located in the discharging position and an accordingly small volume when the valve body is in the charging position.

In other words, if a dose of the fluid is dispensed out of the device by way of the moving or the displacing of the valve body from the charging position into the discharging position, then the next dose of an active substance can already be provided in the re-drawing chamber.

In particular, the re-drawing chamber can be formed together with the main body.

This permits a simple and inexpensive manufacture. Furthermore, a region of the main body which forms a part of the size-variable re-drawing chamber can simultaneously provide a rest or a counter bearing for a spray burst spring.

For forming the re-drawing chamber, one can envisage hollow-cylindrical elements with a circular cross section being formed on the valve body as well as on the main body, said elements engaging into one another, in particular being displaceably mounted in one another. Herein, one can envisage these hollow-cylindrical elements together forming a gap seal. It is likewise conceivable for a seal of a flexible material, for example a lip seal to be arranged at least on one of the two hollow-cylindrical elements, said seal sealing the size-variable re-drawing chamber with respect to its surroundings. A lip seal is accordingly designed in a manner such that the valve body is displaceable with respect to the main body.

It would alternatively be conceivable for the re-drawing chamber to be formed by a size-variable region of the connection between the valve body and the inside of the container. This size-variable region could be designed for example in the form of a bellows as a part-section of a flexible tube.

By way of the provision of a re-drawing chamber, it is furthermore rendered possible to place a flexible tube or a connection between the device and the inside of the container in a stationary manner with respect to the container. A moving of this connection or this flexible tube relative to the container is herewith prevented. This favours a complete emptying of the container.

The re-drawing chamber can assist in the filling of the spray burst chamber. Thus for example it is conceivable for a non-return valve to be located on the container or in the device, said non-return valve merely permitting a gas exchange into the container. Inasmuch as a fluid volume is then transported into the re-drawing chamber, a vacuum which is compensated by the aforementioned non-return valve arises in the container. If now however the valve body is moved from the discharging position into the charging position, then the complete volume consisting of the volume within the container and the re-drawing volume reduces. An overpressure now arises within these two volumes, said overpressure encouraging the transporting of the fluid into the spray burst chamber by way of the vacuum which builds up in the spray burst chamber. The pressure difference between the spray burst chamber and the volumes of the re-drawing chamber and the container increases, which favours a transporting of the fluid into the spray burst chamber.

However, what is conceivable is also a direct connection of an interior of the container to its surroundings by way of an opening which is preferably provided with a device such as a membrane which is impermeable to germs. Such germ-impermeable devices are known as bacteria-tight valves.

A further aspect of the invention relates to a spray applicator for the dispensing of an active substance, in particular to a nose spray. The spray applicator comprises a container, on which a device as described above is arranged.

This permits the provision of a medication in a package ready for dispensing.

The spray applicator or the device can be designed in a manner such that the contents of the container are closed to the surroundings by a valve which seals off bacteria. For this, the bacteria-sealing valve can be formed in the container or in the device and preferably permit a gas exchange merely in one direction, here in the direction of the interior of the container.

This prevents an unallowable vacuum in the container.

BRIEF DESCRIPTION OF THE DRAWINGS

The invention is hereinafter explained in more detail by way of schematic figures which merely show individual ones of several possible embodiments. There are shown in.

DETAILED DESCRIPTION OF THE PREFERRED EMBODIMENTS

Figure 1:
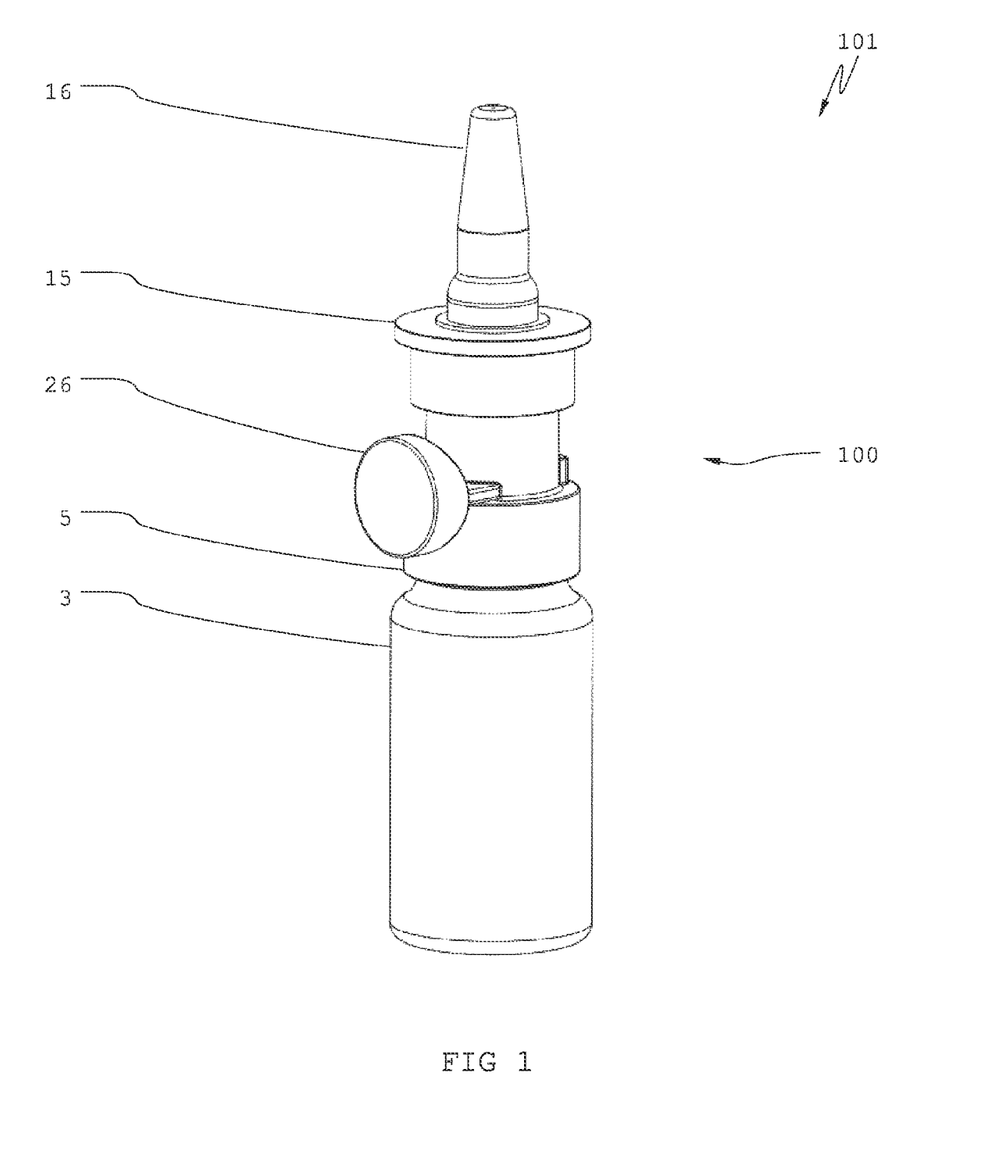
FIG. 1: a perspective view of a spray applicator.

FIG. 1 shows a perspective view of a spray applicator 101 which here is designed as a nose spray. The spray applicator 101 comprises a container 3 and a device 100 for dispensing a liquid out of the container 3. What is visible on the device 100 for dispensing the fluid is a nozzle body 16, on which an actuation element 15 is arranged. An activation mechanism 26 is arranged laterally on the device 100. The device 100 furthermore comprises a main body 5. The device 100 is fastened with the main body 5 to the container 3 and here is screwed with this.

Figure 2:
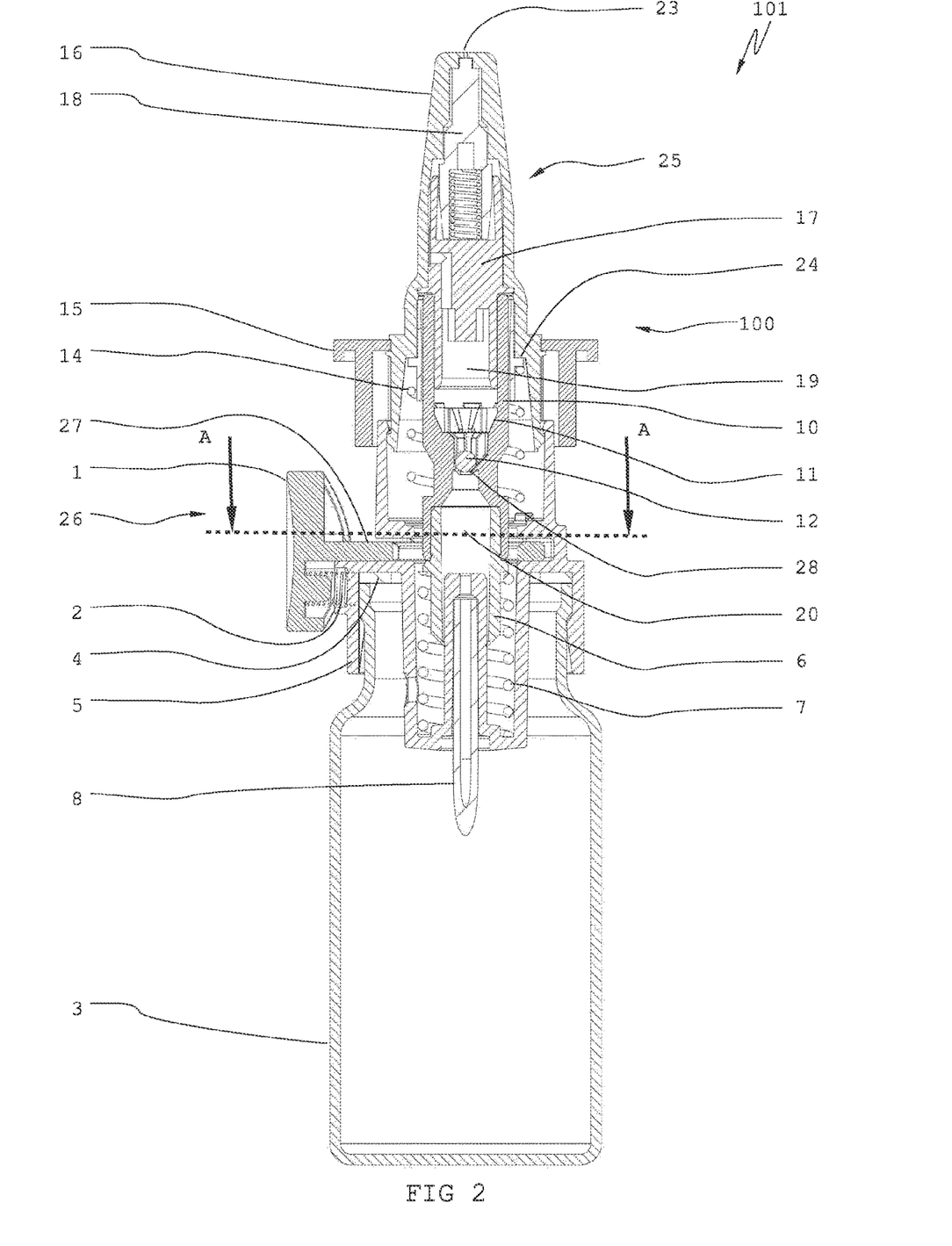
FIG. 2: a cross section through the spray applicator of FIG. 1.

FIG. 2 shows a cross section through the spray applicator 101 of FIG. 1. The device 100 which is arranged on the spray applicator 101 comprises a main body 5 and a nozzle body 16. The nozzle body 16 is mounted in the main body in an axially displaceable manner. For this, the nozzle body 16 and the main body 5 comprises essentially circular or hollow-cylindrical elements which engage into one another. The hollow-cylindrical element of the nozzle body 16 comprises lugs which engage into a projecting ring on the main body 5, so that the nozzle body 16 is captively held in the main body 5 and with regard to its axial position relative to the main body 5 assumes a defined position as soon as the lugs and the projecting ring engage into one another. This position corresponds to a dispensing position, in other words the position which the nozzle body 16 has during the dispensing of the liquid. The nozzle body 16 here is designed as a nose cap.

The nozzle body 16 together with the main body 5 forms an interior, in which a restoring spring 14 is arranged. This restoring spring 14 holds the nozzle body 16 in the aforementioned defined position. The restoring spring 14 is designed as a helical spring.

The main body 5 is fastened on a container 3. Here, this fastening is designed as a snap connection. A flat seal 4 is arranged between the main body 5 and the container 3 in order to seal the container 3 with respect to the surroundings. The flat seal 4 is designed as a flexible flat seal.

For displacing the nozzle body 16, an actuation element 15 which here is designed as a separate actuation ring is arranged on this. By way of pressing upon the actuation element 15, the nozzle body 16 can be displaced in the axial direction in the direction of the container 3 counter to a force of the restoring spring 14.

A valve body 10 is arranged within the main body 5. The valve body 10 is axially displaceably mounted. Together with the nozzle body 16, the valve body 10 forms a spray burst chamber 19. For this, the valve body 10 comprises a circular, hollow-cylindrical element, into which an essentially complementary element of the nozzle body 16 engages. Here, this is likewise designed in a hollow-cylindrical manner. Furthermore, this complementary element of the nozzle body 16 is arranged on a separately formed spray burst guide 17 which is part of the nozzle body 16 and here furthermore carries out a double function, which will be dealt with hereinafter.

For sealing the spray burst chamber 19, a gap seal is formed between the hollow-cylindrical element of the valve body 10 and the complementary element of the nozzle body 16. A lip seal can likewise be present.

Furthermore, a sliding guide 24 is arranged in the nozzle body 16 for an improved guiding of the valve body 10.

Furthermore a spray burst spring 7 which acts upon the valve body 10 so that this is held in a defined position is arranged in the main body 5. The spray burst spring 7 here is arranged between the main body 5 and the valve body 10 in a manner such that the valve body 10 is moved in the flow direction by way of the spring force. The spray burst spring 7 is designed as a helical spring. In FIG. 2, the spray burst body 10 is held in the discharging position by the spray burst spring 7 which means in a position in which the liquid or the fluid is discharged. The spray burst chamber 19 has a minimal volume in this configuration.

A non-return valve 28 is arranged within the valve body 10. Here, this is designed as a ball non-return valve and comprises a ball 12 which is held in a tolerance fit by a corresponding holding element 11. The non-return valve 28 seals the spray burst chamber 19 with respect to the surroundings and here with respect to an interior of the container 3.

An outlet nozzle 23 is located at the end of the nozzle body 16 which is at the top in the FIG. 2. The connection between the container 3 and the outlet nozzle 23 defines the flow direction of the fluid which is to be delivered and which is located in the container 3. Here, all elements are arranged along an axis which extends from the base of the container 3 through the outlet opening 23 and which defines the axial direction.

The outlet nozzle 23 is thus situated downstream of the non-return valve 28 and the container 3 is located upstream of the non-return valve 28.

The outlet nozzle 23 is closed with a nozzle closure 18 which comprises a sealing plug in the region of the outlet nozzle 23. A spring element which is not described in more detail and which holds the sealing plug in its position which is shown here is arranged within the nozzle closure 18. The spray burst guide 17 here serves its double function as a counter bearing for the resilient element. The nozzle closure 18 together with the resilient element forms the outlet closure element 25.

A channel which connects the spray burst chamber 19 to an annular gap between the spray burst guide 17 and the nozzle chamber 16 and which is not described in more detail is arranged within the spray burst guide 17. As soon as a pressure is built up in the spray burst chamber 19, liquid is transported into the annular gap where in turn a pressure builds up. This pressure propagates and acts upon the respective surfaces on the nozzle closure 18 and displaces this in the direction of the container 3 and thus counter to the flow direction of the liquid. This movement is effected counter to a spring force of the resilient element which here is designed as a helical spring. The sealing plug is moved out of the outlet opening 23 by way of this movement and the outlet opening 23 is thus released. The liquid which is located in the spray burst chamber 19 can therefore be delivered out of the outlet opening 23 as long as the pressure is maintained.

The valve body 10 together with the main body 5 forms a re-drawing chamber 20. For this, the valve body 10 comprises a circular, hollow-cylindrical element, into which an essentially complementary element of the main body 3 engages. Here, this is likewise designed in a hollow-cylindrical manner. A separately formed sealing body 6 which seals the re-drawing chamber 20 with respect to its surroundings is arranged between this complementary element of the main body 5 and the hollow-cylindrical element of the valve body 10.

However, one can imagine omitting the sealing body 6 and designing the valve body 10 accordingly, so that this together with the main body 5 forms a gap seal, or providing a lip seal between the valve body 10 and the main body 5 for sealing the re-drawing chamber 20.

A connection into the interior of the container 3 which here is designed as a flexible tube 8 is incorporated in the main body 5.

The device 100 comprises an activation mechanism 26 which is arranged essentially laterally on the device 100. The activation mechanism 26 comprises a push button 1 and an actuation element 27 which extends into the device 100 and embraces the valve body 10. The actuation element 27 and the push button 1 are manufactured as one piece here. Furthermore, a spring 2 which holds the holding element 27 in its end position is arranged on the activation mechanism 26. The end position corresponds to a position, in which the holding element 27 is moved radially outwards with respect to the longitudinal axis of the device 100, so that the push button 1 must be moved in the direction of the longitudinal axis for activation.

The holding element 27 comprises an opening with an arresting element 22 (see FIG. 7 or 8) which can be brought into engagement with a corresponding element on the valve body 10. Here, this element is designed as a circumferential shoulder on the valve body 10.

With reference to FIGS. 3 to 8, the function of the spray applicator 101 is explained hereinafter. FIGS. 3 to 6 each show the sectioned view of the spray applicator 101 according to FIG. 2, wherein individual components are represented in different positions.

Figure 3:
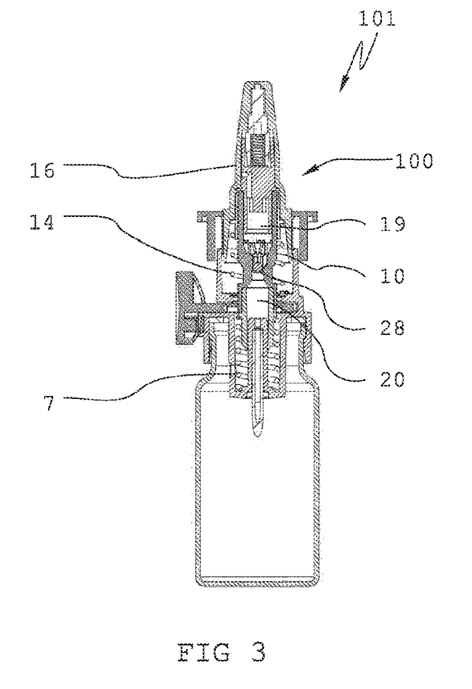
FIG. 3: the cross section of FIG. 2 with the spray applicator in a first position.

FIG. 3 shows the spray applicator 101 in a non-loaded state, according to the representation according to FIG. 2. The restoring spring 14 holds the nozzle body 16 in its dispensing position, which is to say the nozzle body 16 has a position, in which the liquid can be dispensed out of the nozzle body 16. The spray burst spring 7 holds the valve body 10 in the discharging position, which is to say in the position, in which the liquid has been delivered out of the device 100 or out of the spray applicator 101, thus discharged. The valve body 10 together with the nozzle body 16 forms a spray burst chamber 19 which has a small volume in this position. The nozzle body 16 in FIG. 3 is located in the dispensing position, the valve body 10 in the discharging position.

Figure 4:
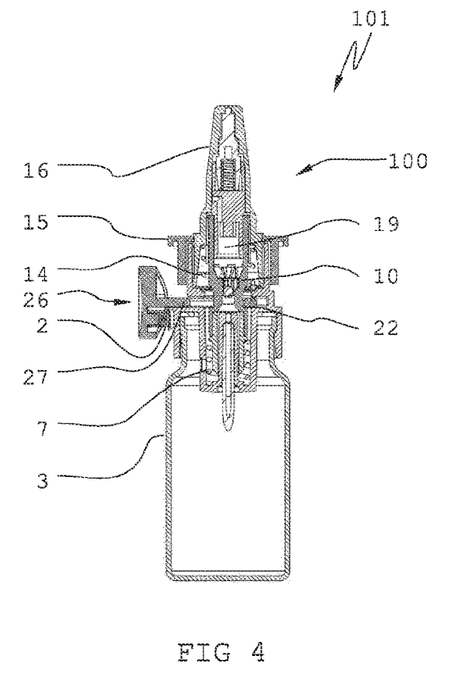
FIG. 4: the cross section of FIG. 2 with the spray applicator in a second position.

FIG. 4 shows the spray applicator 101 in an actuated state. For actuation, the user presses the actuation element 165 in the direction of the container 3. On account of the displacing of the actuation element 15, the nozzle body 16 is likewise displaced in the direction of the container 3. Herein, the restoring spring 14 is pressed together. In other words, the nozzle body 16 is actuated counter to the spring force of the restoring spring 14. On displacing the nozzle body 16, this engages with the valve body 10. The valve body 10 is therefore likewise moved in the direction of the container 3. Herein, the spray burst spring 7 is pressed together. In other words, the valve body 10 is actuated counter to the spring force of the spray burst spring 7.

By way of actuating the actuation element 15, the restoring spring 14 and the spray burst spring 17 are simultaneously loaded. The nozzle body 16 is located in the loaded position in FIG. 4.

The valve body 10 in FIG. 4 is already displaced so far in the direction of the container 3 that an arresting element 22 (see also FIG. 7) of the holding element 27 of the activation mechanism 26 is in engagement with a corresponding element on the valve body 10. Herein, the holding element 27 has been moved radially outwards with respect to the nozzle body 16 by way of the spring force of the spring 2, in a manner such that the arresting element 22 arrests the valve body 10 counter to the spring force of the spray burst spring 7. The valve body 10 is now located in the charging position, thus in the position in which the device can be charged.

In the position according to FIG. 4, in which the nozzle body 16 is situated in the loaded position and the valve body 10 is situated in the charging position, the volume of the spray burst chamber 19 has not changed or only to an insignificant extent with respect to the position according to FIG. 3.

Figure 5:
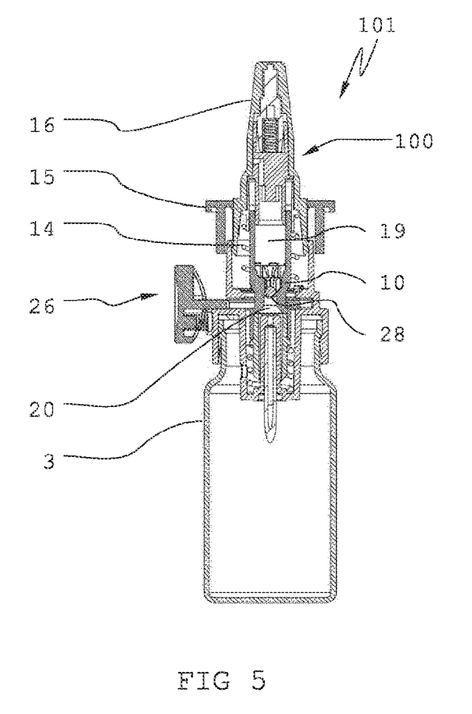
FIG. 5: the cross section of FIG. 2 with the spray applicator in a third position.

FIG. 5 shows the spray applicator 101 in a charged state. The user, after the valve body 10 is held in the charging position by the activation mechanism 26, has relieved the actuation element 15. By way of the spring force of the restoring spring 14, the nozzle body 16 has been moved back into the dispensing position. This movement has simultaneously caused an enlargement of the volume of the spray burst chamber 19. By way of this enlargement, a vacuum has arisen in the spray burst chamber 19 by way of which vacuum a liquid has been sucked out of the container 3 into the spray burst chamber 19. Herein, the liquid has passed the non-return valve 28. This spring-assisted movement ensures that each charging procedure is carried out straight way, as soon as the user lets go of the actuation element 15.

This on the one hand permits the user to charge or be able to charge the spray applicator 101 before it is used, for example given a nose spray, as is described here, before this is brought into a nasal cavity. Furthermore, it is made possible for the spray applicator 101 to be operated with both hands or with an aid. Furthermore, the spray applicator 101 can be stored in a biased manner.

Figure 6:
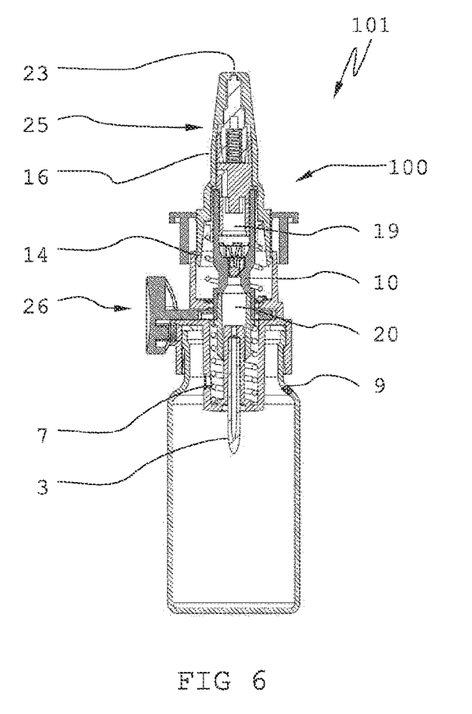
FIG. 6: the cross section of FIG. 2 with the spray applicator in a fourth position.

For dispensing this volume of fluid which is located in the spray burst chamber 19, the activation mechanism 26 is actuated. FIG. 6 shows the state after the activation. The valve body 10 is released by way of the actuation of the activation mechanism 26. The spray burst spring 7 moves the valve body in the flow direction in the direction of the outlet opening 23. An overpressure which propagates to the outlet opening 12 arises in the spray burst chamber 19. The outlet closure element 25 is pressed together by way of this overpressure, so that this releases the outlet opening 23 and the liquid can escape from the spray burst chamber 19 out of the outlet opening 23 in the form of a spray mist. During the dispensing of the spray mist, the nozzle body 16 does not change its position, in other words, it remains in the dispensing position. After the actuation of the activation mechanism 16 and the dispensing of the spray mist, the spray applicator 101 is again located in its original position according to FIG. 3.

The spray burst is always equally strong due to the spray burst spring 7.

A size-variable re-drawing chamber 20 is located upstream of the non-return valve 28 (see FIG. 3). In the position according to FIG. 5, this has a first small volume. During the activating of the spray applicator 101 (from the position according to FIG. 5 to the position according to FIG. 6), an enlargement of the re-drawing chamber 20 is created by the moving of the valve body 10 in the direction of the outlet opening 23. This results in a vacuum being produced within the re-drawing chamber 20. On account of this vacuum, a dose of liquid which is located in the container 3 is transported into the re-drawing chamber 20. In order to avoid or prevent a vacuum in the container 3, a bacteria-sealing, gas-permeable valve 9 which here is arranged in the wall of the container 2 is provided.

The bacteria-sealing valve 9 can be designed as a non-return valve. On charging the spray applicator 101 (steps according to FIG. 4) the dose of liquid which is located in the re-drawing chamber 20 is transported back into the container 3 and an overpressure builds up since no air can escape from the container 3. This overpressure assists in the filling of the spray burst chamber 19 after letting go of the actuation element 15.

This re-drawing chamber 20 further has the advantage that a tube 8 which extends from the device 100 into the container 3 does not move, thus has a constant position with respect to the container 3.

Figure 7:
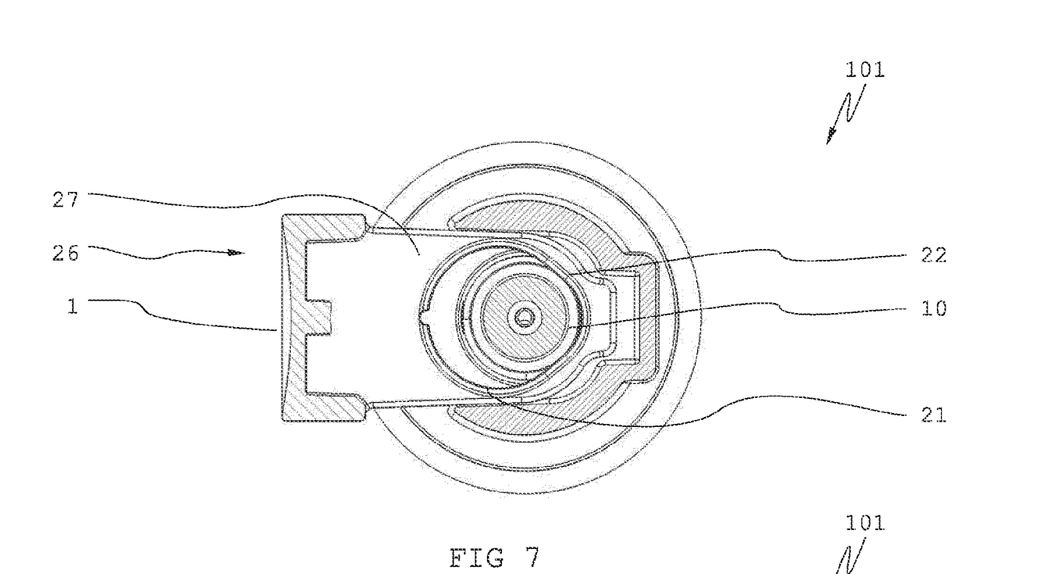
FIG. 7: a cross section through the activation mechanism of the spray applicator of FIG. 2 in a first position.
Figure 8:
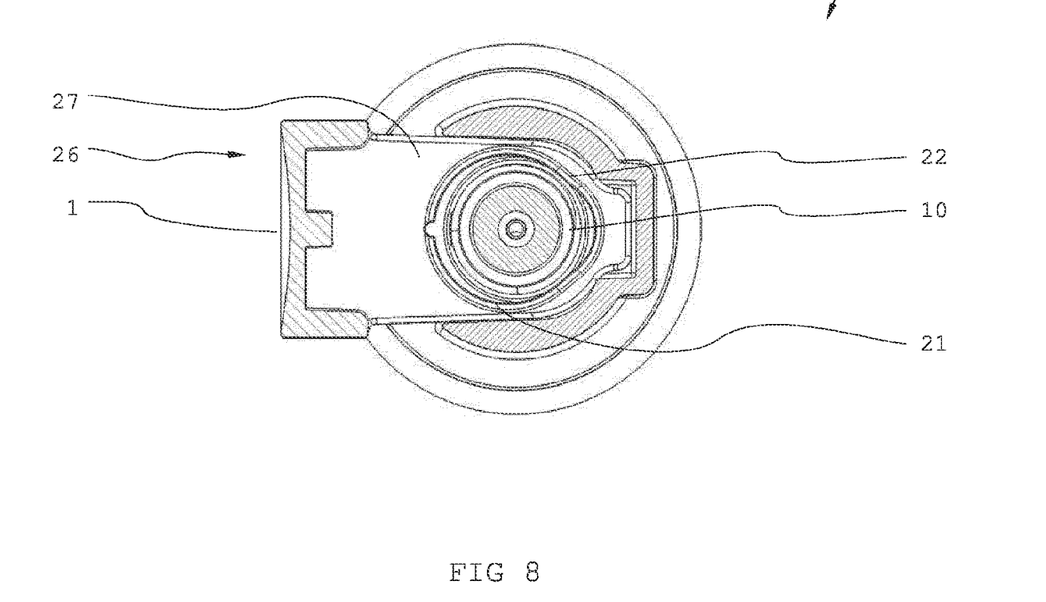
FIG. 8: a cross section through the activation mechanism of the spray applicator of FIG. 2 in a second position.

FIGS. 7 and 8 each show a cross section through the activation mechanism 26 of the spray applicator 101 of FIG. 1 in a first and second position along the section line A-A of FIG. 2. The activation mechanism 26 comprises a push button 1 and a holding element 27, wherein the push button 1 and the holding element 27 are manufactured as one piece. An opening which has two different cross sections is arranged in the holding element 27. These cross sections are designed in the shape of two circular openings of a different diameter which engage into one another. The smaller of the two circular openings provides an arresting element 22. Due to the design as a circular opening, the arresting element 22 interacts with the valve body 10 at several regions, here at two sides and over a region of about 100° around the valve body 10. The arresting element 22 regionally embraces the valve body 10. FIG. 7 shows the position according to FIG. 4, in which the holding element 27 is in engagement with the valve element 10 and holds this in the charging position. FIG. 8 shows a position after actuation of the activation mechanism 26. For this, the push button 1 has been actuated and the holding element 26 displaced in the radial direction with respect to the valve body 10, so that the holding element 29 has released the valve body 10.

For assembling the device 100, the holding element is radially moved yet further and the nozzle body 16 (see for example FIG. 2) is moved in the direction of the container 3, in which the device 100 is brought through the opening in the holding element 27 in the region of the larger circular opening 21.

Figure 9:
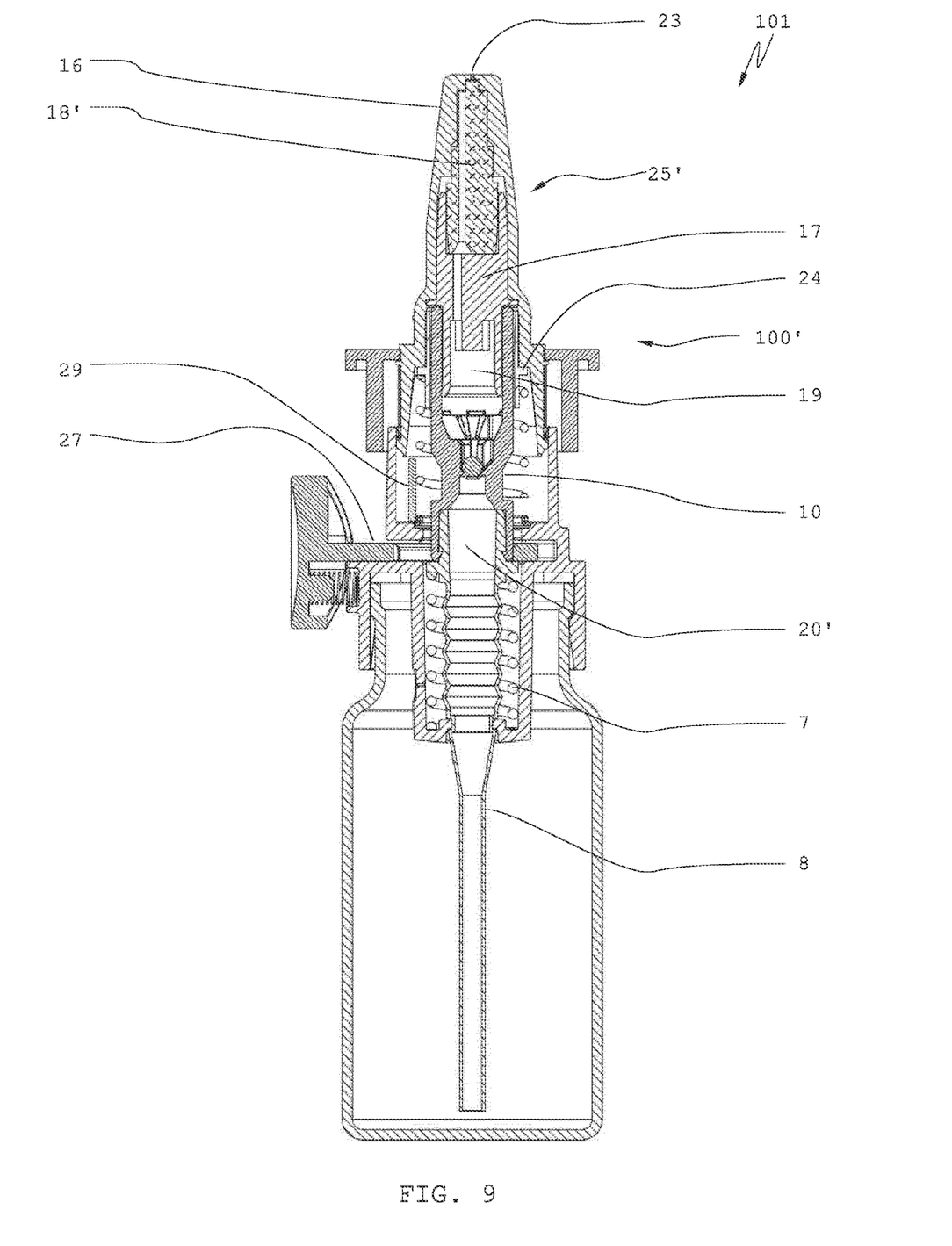
FIG. 9: a spray applicator with an alternative embodiment of a device of the dispensing of a liquid.

FIG. 9 shows a spray applicator 101 with an alternative embodiment of a device 100' for the metered dispensing of a liquid, in a view according to FIG. 2. Here, only the elements which differ from the embodiment according to FIG. 2 or are directly necessary for the description of the function are denoted and described. The remaining elements correspond to those of the embodiment according to FIG. 2 and accordingly the description of the figure of FIG. 2 is referred to.

The outlet nozzle 23 is closed with a nozzle cosure 18' which in the region of the outlet nozzle comprises a sealing plug. The nozzle closure 18' here is formed from a closed-pored foam. Herewith, the nozzle closure 18' is compressible and itself forms a resilient element which holds the sealing plug in its position which is shown here. The spray burst guide 17 here serves its double function as a counter bearing for the nozzle closure 18'. The nozzle closure 81' forms the outlet closure element 25'.

A channel which is not shown in more detail is arranged within the spray burst guide 17 and runs out into a channel which is not described in more detail and which extends through the nozzle closure 18'. This channel of the nozzle closure 18' in turn runs out into an annular gap between the nozzle closure 18' and the nozzle body 16. As soon as a pressure is built up in the spray burst chamber 19, liquid is transported into the annular gap where again a pressure builds up. This pressure propagates and acts upon corresponding surfaces on the nozzle closure 18' and compresses this in the direction of the container, or counter to the flow direction of the liquid. The sealing plug is moved out of the outlet opening 23 by way of this compressing and the outlet opening 23 is thus released. The liquid which is located in the spray burst chamber 19 can therefore be delivered out of the outlet opening 23 as long as the pressure is maintained.

The outlet closure element 25' which is described here can be inserted in the device 100 according to FIG. 2, independently of the design of the re-drawing chamber 20'.

The device 100' of the spray applicator 101 according to FIG. 9 further comprises an alternative embodiment of the re-drawing chamber 20'. The re-drawing chamber 20' is designed as a size-variable bellows and here is designed as one piece with the flexible tube. However, it could also be manufactured separately and be connected to the tube 8, for example by press connection. The bellows is connected via a snap connection which is not shown in more detail, to the valve body 10' which comprises correspondingly designed connection elements. A separate sealing body which seals the fluid flow to the spray burst spring 7 is not necessary in this embodiment.

The re-drawing chamber 20' which is shown here can be inserted in the device 100 according to FIG. 2, independently of the design of the outlet closure element 25'.

The device 100' of the spray applicator 101 according to FIG. 9 furthermore comprises a blocking element 29 which is optional in all embodiments. This blocking element 29 is arranged on the holding element 27 with a connection which is not shown in more detail.

With regard to the longitudinal axis of the device 100', the blocking element 20 is designed in a flexible manner, so that on actuating the nozzle body 16 it can slide along the inner surface of the nozzle body 16.

If the nozzle body 16 is in the loaded position and herewith the valve body 10 in the charging position, the holding element 27 moves radially outwards with respect to the longitudinal axis. Accordingly, the blocking element 29 is likewise displaced. Since it is flexible, a free end of the blocking element 29 bends inwards. If the nozzle body 16 is now let go of, the blocking element 16 bends radially outwards and grips together with a corresponding projection or element of the nozzle body 16.

The invention claimed is:

1. A device (100, 100') for metered dispensing of a liquid out of a container (3) comprising
    a main body (5) for fastening to the container (3),
    a nozzle body (16) with an outlet nozzle (23),
    wherein the nozzle body (16) is displaceably mounted with respect to the main body (5) from a dispensing position into a loaded position,
    a restoring spring (15) for moving the nozzle body (16) from the loaded position into the dispensing position,
    a valve body (10) which is displaceably mounted with regard to the main body (5) from a charging position into a discharging position,
    a non-return valve (28) is arranged in the valve body (10), and
    the valve body (10) with the nozzle body (16) forms a size-variable spray burst chamber (19), and the spray burst chamber (19) is connected to the outlet nozzle (23).

2. The device (100, 100') according to claim 1, wherein the device comprises a spray burst spring (7) for moving the valve body (10) from the charging position into the discharging position.

3. The device (100, 100') according to claim 1, wherein the device comprises an actuation element (15), and the actuation element (15) is arranged on the nozzle body (16).

4. The device (100, 100') according to claim 1, wherein the nozzle body (16) is in active connection or can be brought into active connection with the valve body (10) in such a manner that displacement of the nozzle body (16) from the dispensing position into the loaded position creates displacement of the valve body (10) from the discharging position into the charging position.

5. The device (100, 100') according to claim 1, wherein the device comprises an activation mechanism (26) for holding the valve body (10) in the charging position.

6. The device (100, 100') according to claim 5, wherein in the charging position of the valve body (10), displacement of the nozzle body (16) from the dispensing position into the loaded position effects a reduction of a volume of the spray burst container (19).

7. The device (100, 100') according to claim 5, wherein the device (100, 100') comprises a blocking element which is arranged in such a manner that displacement of the nozzle body (16) from the dispensing position into the loaded position is prevented when the valve body (10) is situated in the charging position .

8. The device (100, 100') according to claim 5, wherein the activation mechanism (26) comprises a holding element (27) and is arranged laterally of the valve body (10) and can be actuated transversely to a flow direction of the liquid through the valve body (10).

9. The device (100, 100') according to claim 8, wherein the holding element (27) embraces the valve body regionally completely on two sides.

10. The device (100, 100') according to claim 8, wherein the holding element (27) comprises an opening with at least one arresting element (22).

11. The device (100, 100') according to claim 10, wherein the opening has two different cross sections, and the openings are designed as two circle openings of a different diameter which engage into one another.

12. The device (100, 100') according to claim 8, wherein a restoring device, for holding the holding element (27) in an end position, is arranged on the activation mechanism.

13. The device (100, 100') according to claim 1, wherein the outlet nozzle (23) is closed with an outlet closure element (25, 25').

14. The device (100, 100') according to claim 13, wherein the outlet closure element (25, 25') comprises a resiliently mounted sealing element.

15. The device (100, 100') according to claim 13, wherein the outlet closure element (25, 25') is compressible at least regionally and is manufactured from a compressible material .

16. The device (100, 100') according to claim 1, wherein the valve body (10) is connected or connectable to an interior of the container (3) upstream of the non-return valve (28).

17. The device (100, 100') according to claim 1, wherein the valve body (10), upstream of the non-return valve (18), forms a size-variable re-drawing chamber (20, 20').

18. A spray applicator (10) for dispensing an active substance comprising a container (3), on which the device (100, 100') according to claim 1 is arranged.

19. The spray applicator (101) according to claim 18, wherein contents of the container (3) are closed to surroundings by a bacteria-sealing valve (28).

* * * * *